(12) United States Patent
Tanabe

(10) Patent No.: US 8,146,122 B2
(45) Date of Patent: Mar. 27, 2012

(54) RECEIVING APPARATUS

(75) Inventor: Akihiro Tanabe, Minato-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 597 days.

(21) Appl. No.: 11/734,912

(22) Filed: Apr. 13, 2007

(65) Prior Publication Data

US 2007/0242928 A1 Oct. 18, 2007

(30) Foreign Application Priority Data

Apr. 14, 2006 (JP) ................................. 2006-112236

(51) Int. Cl.
*G06F 3/00* (2006.01)
*G06F 13/00* (2006.01)
*H04N 5/445* (2011.01)

(52) U.S. Cl. .......... 725/58; 725/133; 725/141; 725/153; 386/243; 386/297

(58) Field of Classification Search ............ 725/58, 725/68, 85, 100, 110, 131, 151; 386/40, 386/243, 297
See application file for complete search history.

(56) References Cited

U.S. PATENT DOCUMENTS

| | | | |
|---|---|---|---|
| 6,523,176 B1 * | 2/2003 | Yamane et al. | 725/58 |
| 2002/0049620 A1 * | 4/2002 | Uchida et al. | 705/5 |
| 2004/0197082 A1 * | 10/2004 | Yim | 386/83 |
| 2004/0257239 A1 * | 12/2004 | Griesau et al. | 340/825.69 |
| 2005/0210300 A1 * | 9/2005 | Song et al. | 713/300 |
| 2005/0271363 A1 * | 12/2005 | Tanikawa | 386/83 |
| 2006/0041910 A1 * | 2/2006 | Hatanaka et al. | 725/58 |
| 2006/0041911 A1 * | 2/2006 | Matsuyama | 725/58 |
| 2007/0245382 A1 * | 10/2007 | Doi et al. | 725/55 |

FOREIGN PATENT DOCUMENTS

| | | |
|---|---|---|
| JP | 5-207387 A | 8/1993 |
| JP | 2005-244660 A | 9/2005 |
| JP | 2006-050671 A | 2/2006 |

\* cited by examiner

*Primary Examiner* — Pankaj Kumar
*Assistant Examiner* — Alazar Tilahun
(74) *Attorney, Agent, or Firm* — Canon USA Inc. IP Division

(57) ABSTRACT

A receiving apparatus includes a receiving unit configured to receive television broadcasting to generate an output signal, a signal processing unit configured to generate image data of a broadcast program using the output signal, a display unit configured to display an image represented by the image data of the broadcast program on a display apparatus, a reservation information obtaining unit configured to obtain program reservation information for reserving reception of a scheduled broadcast program, and a control unit configured to, responsive to the receiving unit receiving a program preview of a scheduled broadcast program associated with the program reservation information, control the display unit to display the program reservation information on the display apparatus.

4 Claims, 14 Drawing Sheets

FIG. 7

| < TITLE > | < DATE/TIME > | < CHANNEL > |
|---|---|---|
| 1. DRAMA A | 05/02/19  20:00-20:45 | CHANNEL 1 |
| 2. MOTHER NATURE | 05/02/13  20:00-22:00 | CHANNEL 1 |
| 3. MORNING SERIAL DRAMA | 05/02/11  8:15-8:30 | CHANNEL 1 |

FIG. 8
200
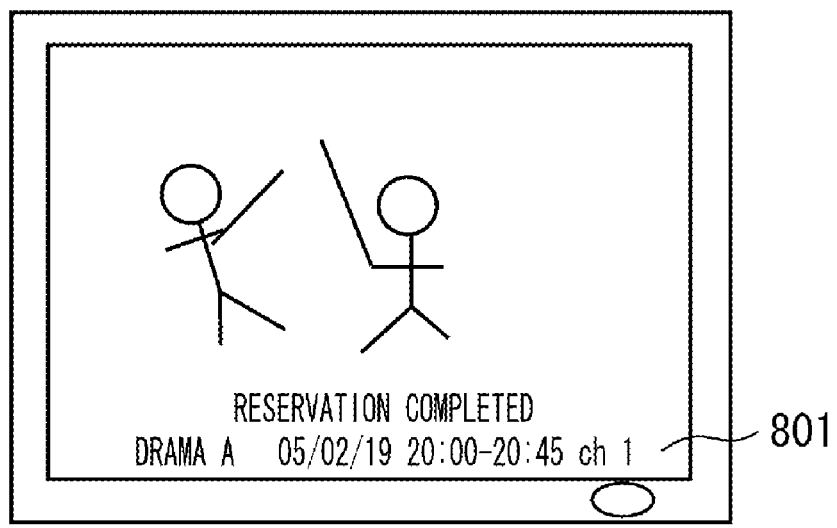

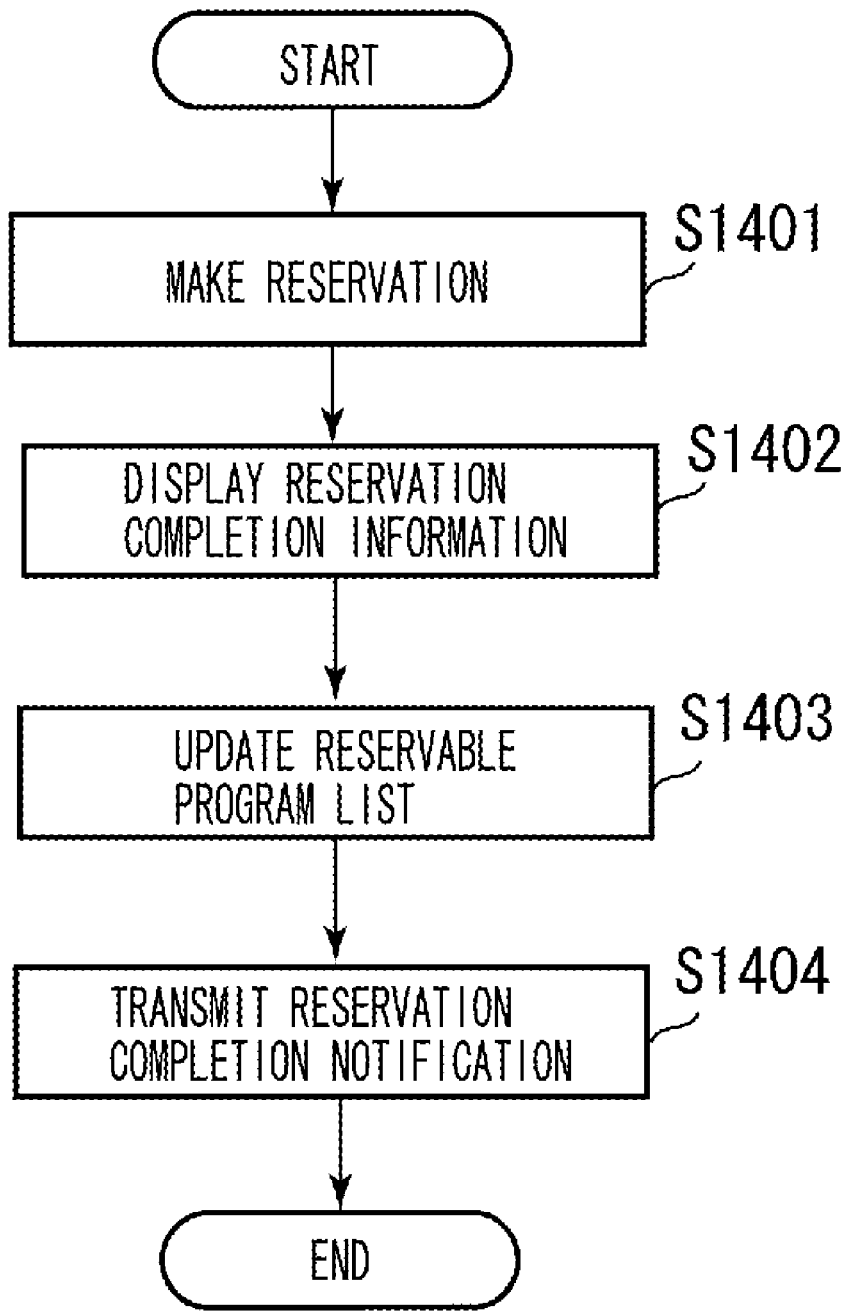

RECEIVING APPARATUS

BACKGROUND OF THE INVENTION

1. Field of the Invention

The present invention relates to a receiving apparatus and, more particularly, to an apparatus configured to receive television broadcasting.

2. Description of the Related Art

In recent years, digitization of television broadcasting is proceeding at a rapid pace. Digitization of television broadcasting enables more efficient use of a broadcasting frequency band as compared to analog television broadcasting and thus can offer high-quality image and sound.

One advantage of digital data over analog data is that digital data is compatible with data other than video and audio data. For example, in digital television broadcasting, various information, such as Electronic Program Guide (EPG) information or data broadcasting information, is multiplexed and broadcast with data of a broadcast program. Such information contributes to improving service quality provided to users/viewers.

Furthermore, disk recorders which are configured to record a television broadcasting program on a mass storage such as a hard disk or a digital versatile disc (DVD) are becoming more popular. Such disk recorders can display a program guide based on EPG information multiplexed on a broadcast wave, thus allowing a user to make a recording reservation using EPG information (see, for example, Japanese Patent Application Laid-Open No. 2005-244660).

For example, suppose a user who is viewing a broadcast program sees a program preview of a scheduled broadcast program and wants to make a recording reservation for the scheduled broadcast program. In such a case, the user needs to remember a title, an airdate, an airtime, a channel of the scheduled broadcast program, stop viewing the current broadcast program, display a program guide, find the scheduled broadcast program, and make a recording reservation.

Also, if the user does not want to stop viewing the current broadcast program, the user needs to take a note of a title, an airdate, an airtime, and a channel of the scheduled broadcast program and make a recording reservation at a later time with the help of the program guide. Thus, if the user cannot find, for example, a memo pad nearby, the user may not be able to take a note and thus fail to keep the airdate, the airtime, the channel, etc., of the scheduled broadcast program. This is inconvenient since the user needs to search for the scheduled broadcast program all over again, for example, using a program guide.

SUMMARY OF THE INVENTION

Exemplary embodiments of the present invention are directed to facilitating reservation of a scheduled broadcast program even during viewing of a broadcast program.

According to an aspect of the present invention, a receiving apparatus includes a receiving unit configured to receive television broadcasting to generate an output signal, a signal processing unit configured to generate image data of a broadcast program using the output signal, a display unit configured to display an image represented by the image data of the broadcast program on a display apparatus, a reservation information obtaining unit configured to obtain program reservation information for reserving reception of a scheduled broadcast program, and a control unit configured to, responsive to the receiving unit receiving a program preview of a scheduled broadcast program associated with the program reservation information, control the display unit to display the program reservation information on the display apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a reservable program list.

FIG. 8 illustrates another example of the display screen of the receiving apparatus.

FIG. 14 is a flowchart illustrating processing performed by the receiving apparatus according to an exemplary embodiment of the present invention.

DETAILED DESCRIPTION OF THE EMBODIMENTS

Various exemplary embodiments, features, and aspects of the invention will be described in detail below with reference to the drawings.

Figure 4:
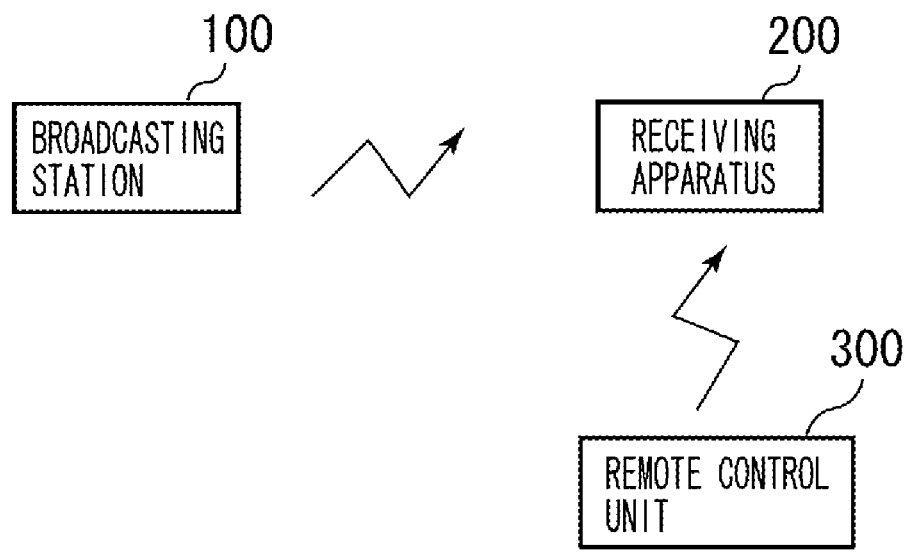
FIG. 4 illustrates a configuration of a receiving system according to an exemplary embodiment of the present invention.

FIG. 4 illustrates a configuration of a television broadcasting receiving system according to an exemplary embodiment of the present invention. A broadcast station 100 can transmit television broadcasting. A receiving apparatus 200 can receive television broadcasting. A remote control unit 300 can operate the receiving apparatus 200.

Figure 1:
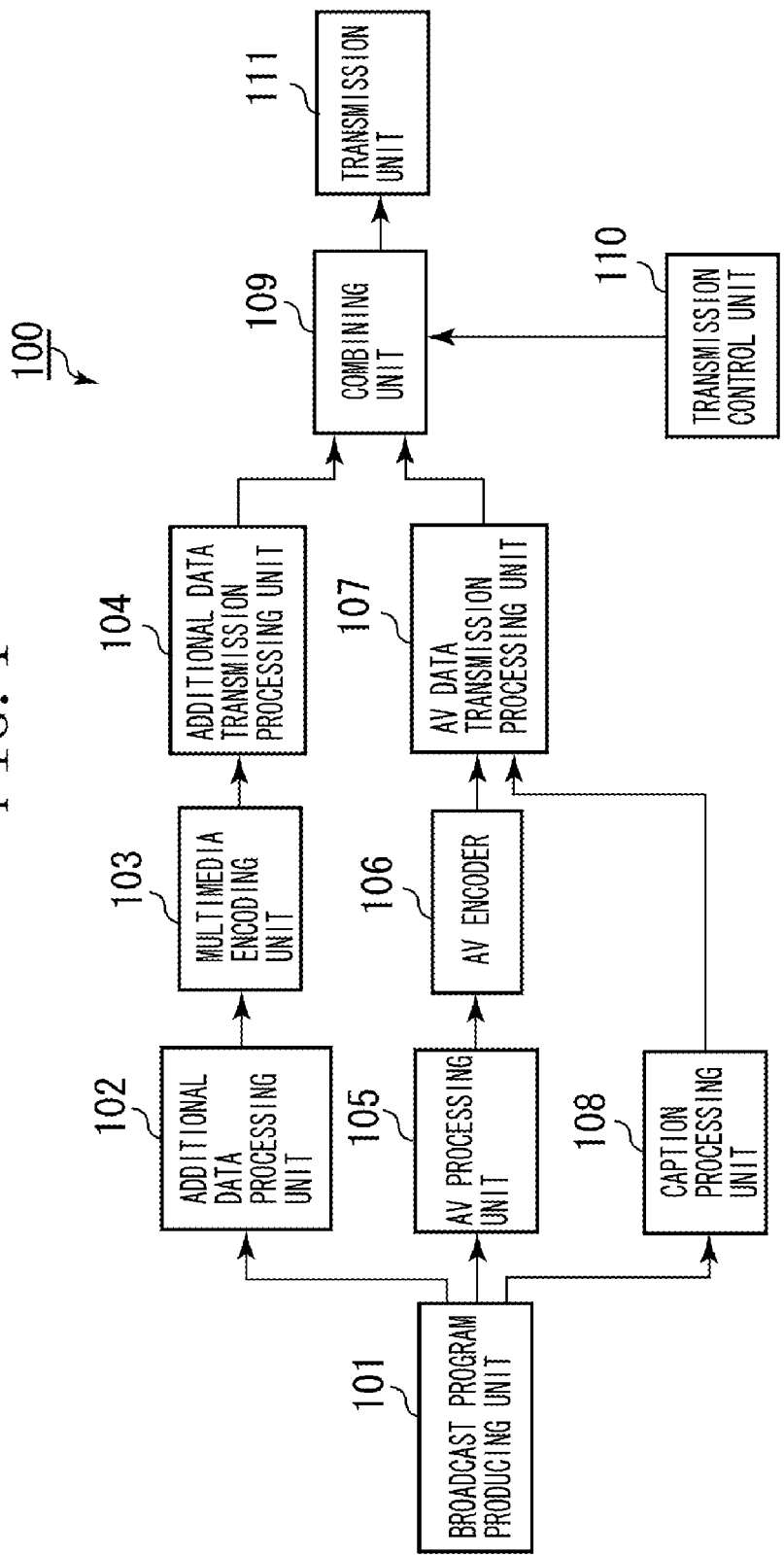
FIG. 1 illustrates a configuration of a broadcast station according to an exemplary embodiment of the present invention.

FIG. 1 illustrates a configuration of the broadcast station 100, which is configured to send out broadcast content. In FIG. 1, a broadcast program producing unit 101 produces content of a broadcast program. More specifically, the broadcast program producing unit 101 produces video and audio data of a broadcast program, caption data, and additional information for digital broadcasting including EPG information.

According to the present embodiment, the broadcast program producing unit 101 also produces a program preview of a scheduled broadcast program. Then, the broadcast program producing unit 101 produces information on the scheduled broadcast program, such as an airdate, an airtime, a channel, and a title of the scheduled broadcast program, as additional information.

An additional data processing unit 102 converts additional information for digital broadcasting generated by the broadcast program producing unit 101, for example, EPG information and data for data broadcasting, into a form which is adapted to broadcasting. The converted additional information is then sent to a multimedia encoding unit 103. The multimedia encoding unit 103 encodes the additional information with a predetermined encoding method and outputs the encoded additional information to an additional data transmission processing unit 104.

Then, the additional data transmission processing unit 104 converts the encoded additional information into a form which conforms to a stream used for transmission, such as a Moving Picture Experts Group Phase 2 (MPEG-2) transport stream (MPEG2-TS), and sends the MPEG2-TS to a combining unit 109.

An audio/video (AV) processing unit 105 converts video data and audio data of a broadcast program generated by the broadcast program producing unit 101 into a form which is adapted to encoding methods. Then, the AV processing unit 105 sends the converted video data and audio data to an AV encoder 106. The AV encoder 106 encodes the converted video data and audio data with predetermined encoding methods and sends the encoded video data and audio to an AV data transmission processing unit 107.

A caption processing unit 108 receives caption data, which is to be multiplexed and displayed with the video data, from the broadcast program producing unit 101, converts the caption data into a form which is adapted to broadcasting, encodes the converted caption data, and sends the encoded caption data to the AV data transmission processing unit 107. The AV data transmission processing unit 107 converts the encoded video data, audio data, and caption data into a form which conforms to a stream used for transmission and sends the stream data to the combining unit 109.

The combining unit 109, according to a transmission timing signal from a transmission control unit 110, multiplexes the video data, audio data, and caption data sent from the AV data transmission processing unit 107 with the additional information sent from the additional data transmission processing unit 104 to generate and output a broadcasting stream. A transmission unit 111 modulates the broadcasting stream output from the combining unit 109, superposes the modulated broadcasting stream on a broadcast wave for transmission, and transmits (broadcasts) the broadcast wave.

The transmission control unit 110 controls the combining unit 109 to cause the transmission unit 111 to transmit video data, audio data, caption data, and data for data broadcasting according to a predetermined broadcasting schedule and to transmit EPG data at a predetermined timing.

Figure 2:
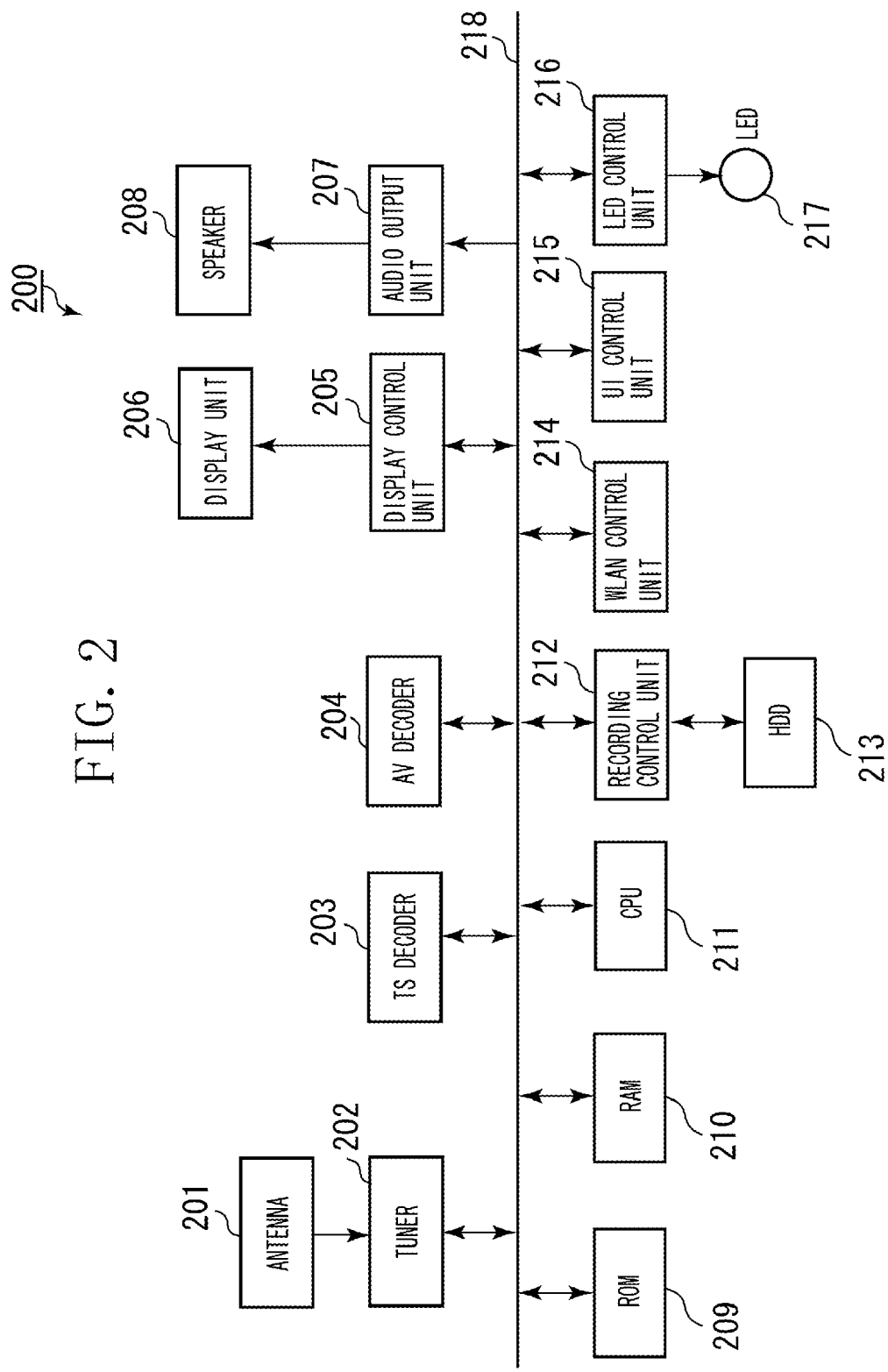
FIG. 2 illustrates a configuration of a receiving apparatus according to an exemplary embodiment of the present invention.

FIG. 2 illustrates a configuration of the receiving apparatus 200. In FIG. 2, an antenna 201 receives a television broadcast wave and sends the broadcast wave to a tuner 202. It is to be noted that in the present embodiment, the broadcast wave includes, but is not limited to, a wire broadcast wave, a satellite broadcast wave, and a terrestrial broadcast wave. The tuner 202 selects a signal of a specified channel from the output of the antenna 201, demodulates and converts the signal into a data stream, and sends the data stream to a transport stream (TS) decoder 203 via a bus 218.

According to the present embodiment, a data stream which is transmitted from a broadcast station is in the MPEG2-TS format. The TS decoder 203 separates the received data stream into video data, audio data, caption data, EPG data for a broadcast program, data for data broadcasting, and other additional information data. Then, the TS decoder 203 sends all of this data to a central processing unit (CPU) 211.

The AV decoder 204 decodes the video data, audio data, and caption data which are in the MPEG2-TS format. Then, the AV decoder 204 outputs the decoded video data and caption data to a display control unit 205, and outputs the decoded audio data to an audio output unit 207. The display control unit 205 converts the video data output from the AV decoder 204 into a form which is adapted for displaying, and displays the converted video data on a display unit 206. The audio output unit 207 outputs the audio data output from the AV decoder 204 to a speaker 208. The speaker 208 outputs sound based on the audio data.

A computer-executable control program is stored in a read-only memory (ROM) 209. The CPU 211 loads and executes the computer-executable control program stored in the ROM 209 when the receiving apparatus 200 is powered on. A random access memory (RAM) 210 is used for the CPU 211 to load a computer-executable program and to read and write work data for the computer-executable program.

The CPU 211 is a central processing unit configured to perform a processing operation and a reading/writing operation to control the entire receiving apparatus 200. When the CPU 211 receives the EPG data from the TS decoder 203 and the user generates an instruction to display a program guide, the CPU 211 controls the display control unit 205 to display the program guide on the display unit 206.

The user can operate the remote control unit 300 to make a viewing reservation or a recording reservation of a broadcast program using the program guide with a predetermined method. The CPU 211, referring to the EPG data, stores reservation setting information, such as an airdate, an airtime, a channel, and a title of a reserved broadcast program in the RAM 210. Also, upon receiving the data for data broadcasting sent from the TS decoder 203, the CPU 211 controls the display control unit 205 to display a data broadcasting screen if the user generates an instruction to display data broadcasting.

A recording control unit 212 controls a hard disk drive (HDD) 213 to record or read AV data and information related to a broadcast program on or from the HDD 213. A wireless local area network (WLAN) control unit 214 is provided to facilitate communication between the receiving apparatus 200 and an external apparatus via a wireless LAN. A user interface (UI) control unit 215 includes a receiver for receiving a transmission command from the remote control unit 300. The UI control unit 215 receives and processes an instruction from the remote control unit 300 or key information from the receiving apparatus 200. A light-emitting diode (LED) control unit 216 receives an instruction from the CPU 211 to turn on or off a light-emitting diode (LED) 217.

According to the present embodiment, the video data and audio data output from the TS decoder 203 can be recorded in the MPEG-2 stream format.

When the CPU 211 is notified via the UI control unit 215 that the remote control unit 300 has generated a recording instruction, the CPU 211 controls the recording control unit 212 to record the video data and audio data output from the AV decoder 204 on the HDD 213.

Also, when the CPU 211 is notified via the UI control unit 215 that the remote control unit 300 has generated a playback instruction, the CPU 211 transmits video data and audio data recorded on the HDD 213 to the AV decoder 204. The AV decoder 204 decodes the video data and audio data. An image represented by the decoded video data is then displayed on the display unit 206 and a sound represented by the decoded audio data is output from the speaker 208.

Also, the CPU 211 controls the tuner 202 to receive data of a specified channel on a predetermined date and time based on the recording reservation information stored in the RAM 210 and causes the HDD 213 to record the received video data and audio data.

Figure 3:
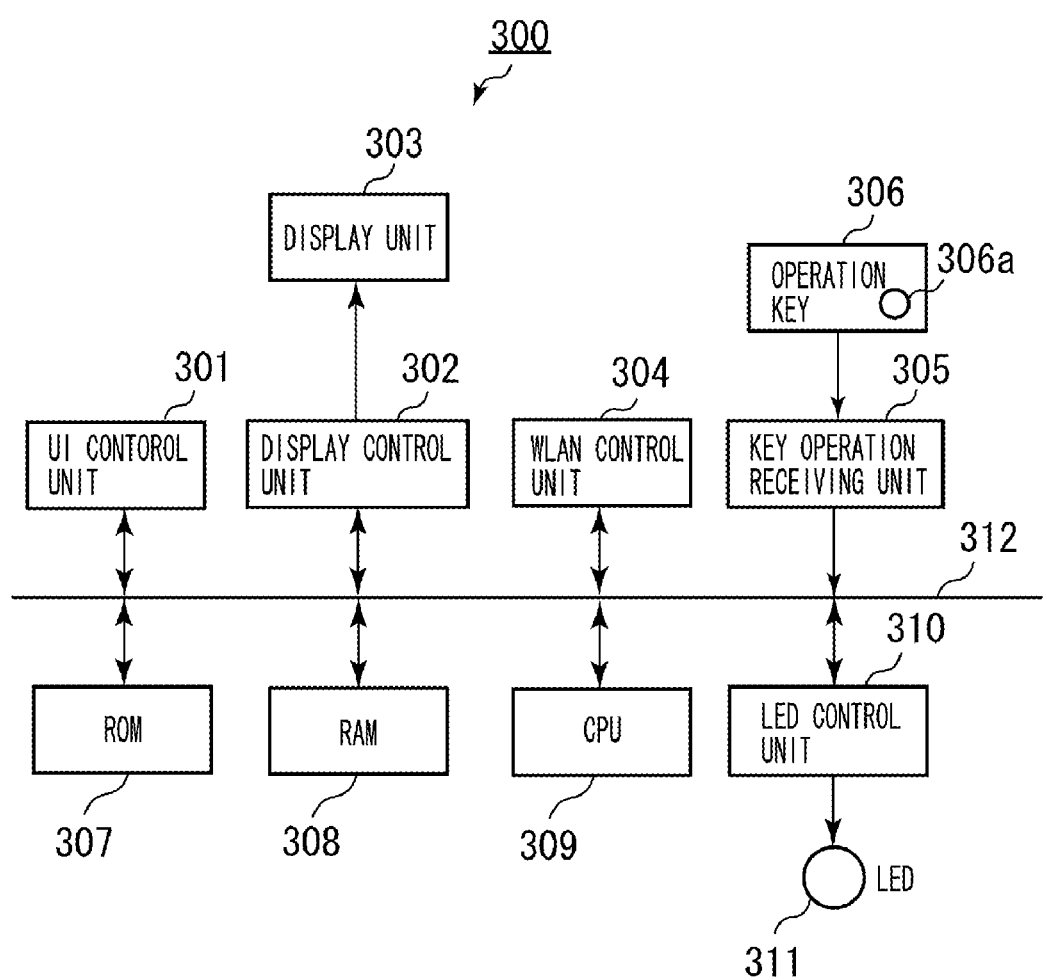
FIG. 3 illustrates a configuration of a remote control unit according to an exemplary embodiment of the present invention.

FIG. 3 illustrates a configuration of the remote control unit 300. In FIG. 3, a user interface (UI) control unit 301 includes a transmitter for transmitting a command to the receiving apparatus 200. Based on key information sent from a key operation receiving unit 305, a CPU 309 causes the UI control unit 301 to transmit a signal to the receiving apparatus 200.

A display control unit 302 displays a video image specified by the CPU 309 on a display unit 303. A WLAN control unit 304 is configured to establish a network connection based on the wireless LAN standard. The key operation receiving unit 305 includes a module configured to detect an operation status of an operation key 306 and to notify the CPU 309 of the operation status as key information.

A ROM 307 stores a computer-executable program used for controlling the remote control unit 300. The computer-executable control program is loaded and executed when the remote control unit 300 is powered on. A RAM 308 is used for the CPU 309 to load a computer-executable program and to read and write work data for the computer-executable program.

The CPU 309 is a central processing unit configured to perform a processing operation and a reading/writing operation to control the remote control unit 300. Upon receiving an instruction from the CPU 309, an LED control unit 310 turns on or off a LED 311. The remote control unit 300 further includes a data bus 312.

The operation key 306 includes a power supply key, a channel switching key, a volume key, an arrow key for moving a cursor, and a confirm key for confirming an operation, etc (not shown). Also, according to the present embodiment, the operation key 306 further includes a reservation key 306a. The function of the reservation key 306a will be described below.

Processing performed when a program preview (promotional program) is received while a broadcast program is being received by the receiving apparatus 200 in FIG. 2 will be described now.

As described above, the broadcast station 100 in FIG. 1 broadcasts a program preview of a scheduled broadcast program between ordinary broadcast programs. In some program previews, information such as an airdate, an airtime, a channel, and a title of a scheduled broadcast program associated with the program preview is multiplexed and transmitted as additional information (preview information) with video and audio data of an ordinary program. According to the present embodiment, the preview information included in a program preview is used to inform a user that a recording reservation is feasible.

Figure 5:
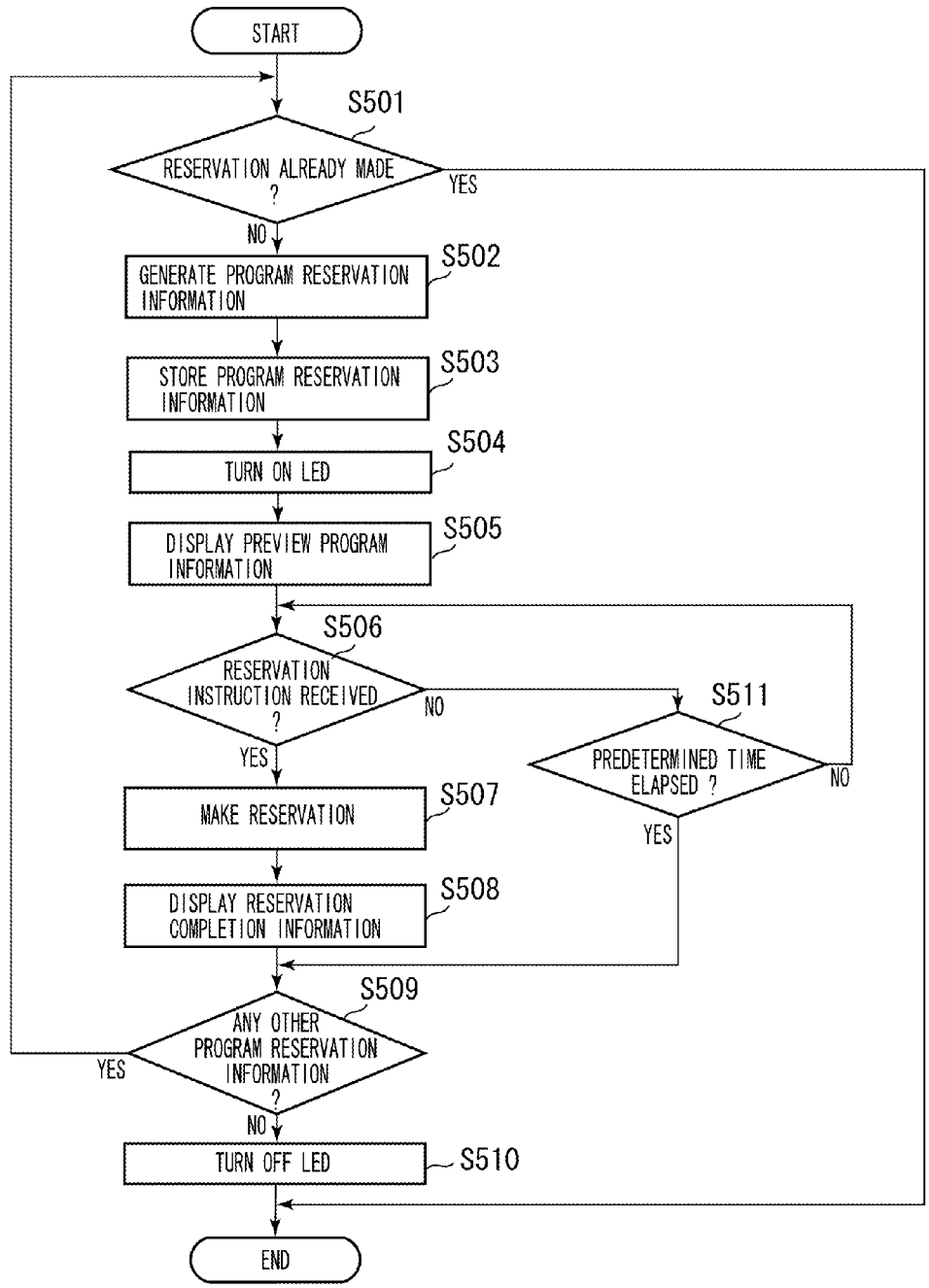
FIG. 5 is a flowchart illustrating processing performed by the receiving apparatus according to an exemplary embodiment of the present invention.

FIG. 5 is a flowchart illustrating an operation of the receiving apparatus 200 performed when the receiving apparatus 200 receives preview information of a scheduled broadcast program.

The CPU 211 checks the additional information output from the TS decoder 203. When the CPU 211 receives and detects preview information associated with a program preview of a scheduled broadcast program, the processing illustrated in FIG. 5 starts.

More specifically, the CPU 211 detects preview information, including an airdate, an airtime, a channel, and a title of a scheduled broadcast program, included in the program preview from the additional information output from the TS decoder 203. Then, in step S501, the CPU 211 compares the reservation setting information on a reserved broadcast program stored in the RAM 210 with the detected preview information and determines whether the scheduled broadcast program associated with the program preview is already reserved. If the scheduled broadcast program is already reserved (YES in step S501), the processing ends.

If the scheduled broadcast program is not yet reserved (NO in step S501), then in step S502, the CPU 211 generates program reservation information including a title, an airdate, an airtime, and a channel of the scheduled broadcast program based on the detected preview information. Next, in step S503, the program reservation information in the RAM 210 is stored in the form of a reservable program list.

FIG. 7 illustrates an example of the reservable program list. As illustrated in FIG. 7, the latest program reservation information is listed at the top of the reservable program list. If a plurality of program previews are serially received and program reservation information is generated one after another, the CPU 211 stores all such information in the RAM 210.

Figure 6:
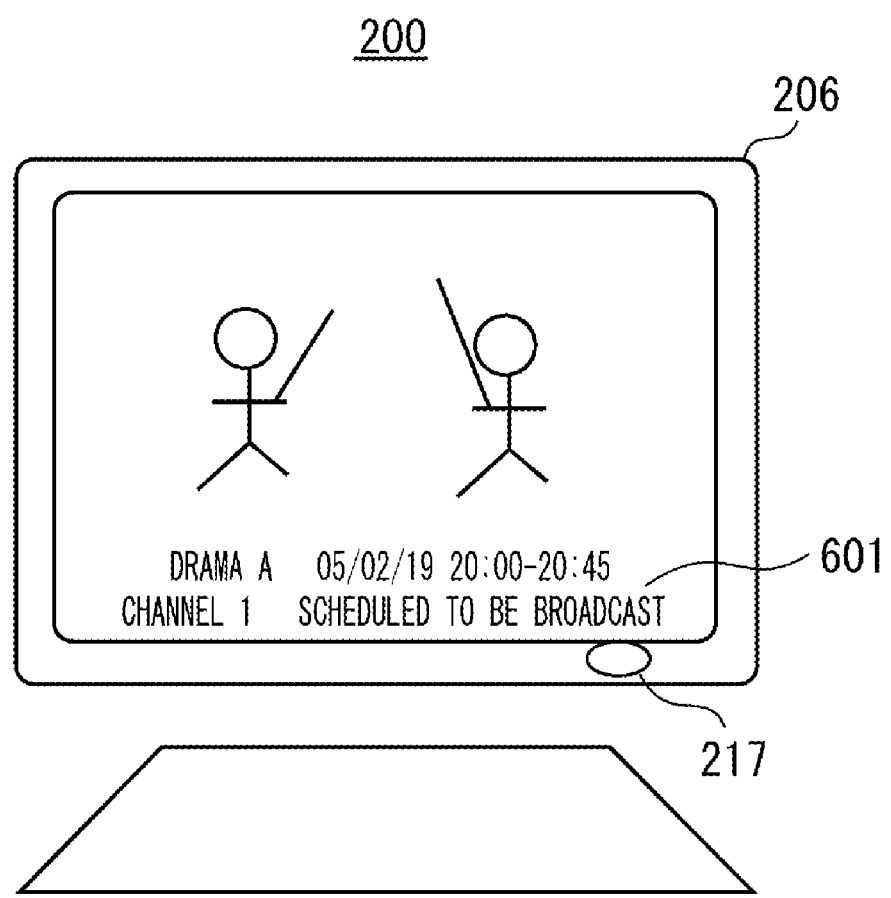
FIG. 6 illustrates an example of a display screen of the receiving apparatus.

Returning to FIG. 5, in step S504, the CPU 211 controls the LED control unit 216 to turn on the LED 217 to notify the user of the presence of a reservable broadcast program. FIG. 6 illustrates the receiving apparatus 200 with the LED 217 arranged on the lower side of the display unit 206.

After the LED 217 is turned on, in step S505, the CPU 211 sends program reservation information including an airdate, an airtime, a channel, a title of the scheduled broadcast program associated with the program preview to the display control unit 205. As illustrated in FIG. 6, the display control unit 205 displays program reservation information 601 together with a video image of the program preview which is being received on the display unit 206.

As described above, according to the present embodiment, when a program preview is received, program reservation information included in the program preview is displayed together with a video image of the program preview.

In step S506, when the program reservation information is displayed, the CPU 211 waits for the user to make a reservation by operating the reservation key 306a arranged on the remote control unit 300. If the user does not make a reservation (NO in step S506), flow proceeds to step S511, the CPU 211 waits further for a predetermined period of time (e.g., several seconds to about one minute). If a reservation instruction is not generated within the predetermined period of time (YES in step S506), the processing proceeds to step S509.

If the CPU 211 receives a reservation instruction (YES in step S506), then in step S507, the CPU 211 makes a recording reservation of a broadcast program listed at the top of the reservable program list. Next, in step S508, the CPU 211 controls the display control unit 205 to display information 801 indicating that the reservation is completed on the display unit 206, as illustrated in FIG. 8. Furthermore, when the reservation is completed, the CPU 211 deletes the program reservation information of the reserved broadcast program from the reservable program list stored in the RAM 210.

In step S509, the CPU 211 determines whether any other program reservation information is stored in the RAM 210. If any other program reservation information is stored in the RAM 210 (YES in step S509), the processing returns to step S501. If no program reservation information is stored in the RAM 210 (NO in step S509), the CPU 211 turns off the LED 217 in step S510. The processing then ends.

According to the processing described above, if a program preview of a scheduled broadcast program is broadcast during viewing of a broadcast program, the user can make a recording reservation of the scheduled broadcast program with a simple operation.

As illustrated in FIG. 5, the reservation cannot be made when a predetermined period of time has elapsed in step S511. Thus, in the present embodiment, even after the LED 217 is turned off in step S510, the reservation can be made using a reservable program list stored in the RAM 210.

Figure 9:
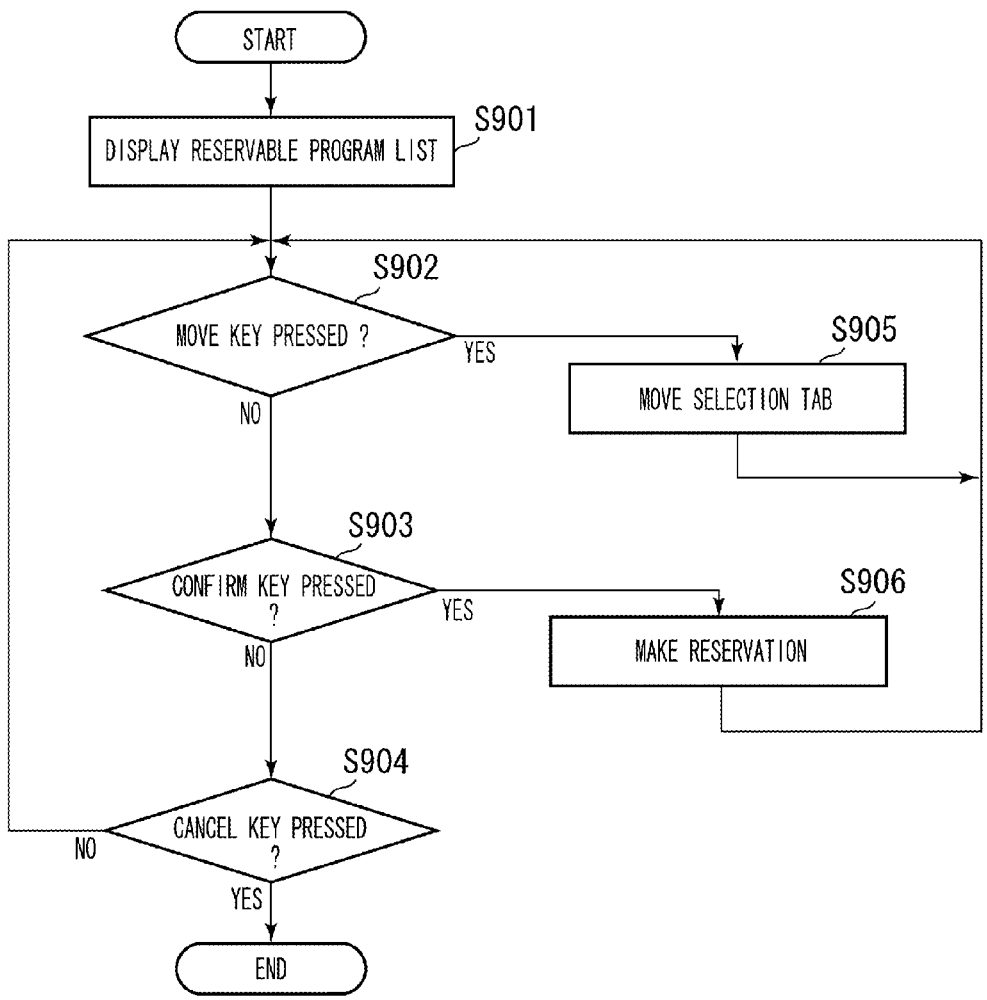
FIG. 9 is a flowchart illustrating reservation setting processing performed by the receiving apparatus according to an exemplary embodiment of the present invention.

FIG. 9 is a flowchart illustrating reservation setting processing using the reservable program list. When the user operates the reservation key 306a arranged on the remote control unit 300, the UI control unit 215 detects that the reservation key 306a is operated, and notifies the CPU 211 that the reservation key 306a is operated. Then, the processing illustrated in FIG. 9 starts. The user can start the processing illustrated in FIG. 9 by operating the reservation key 306a at any timing.

Figure 10:
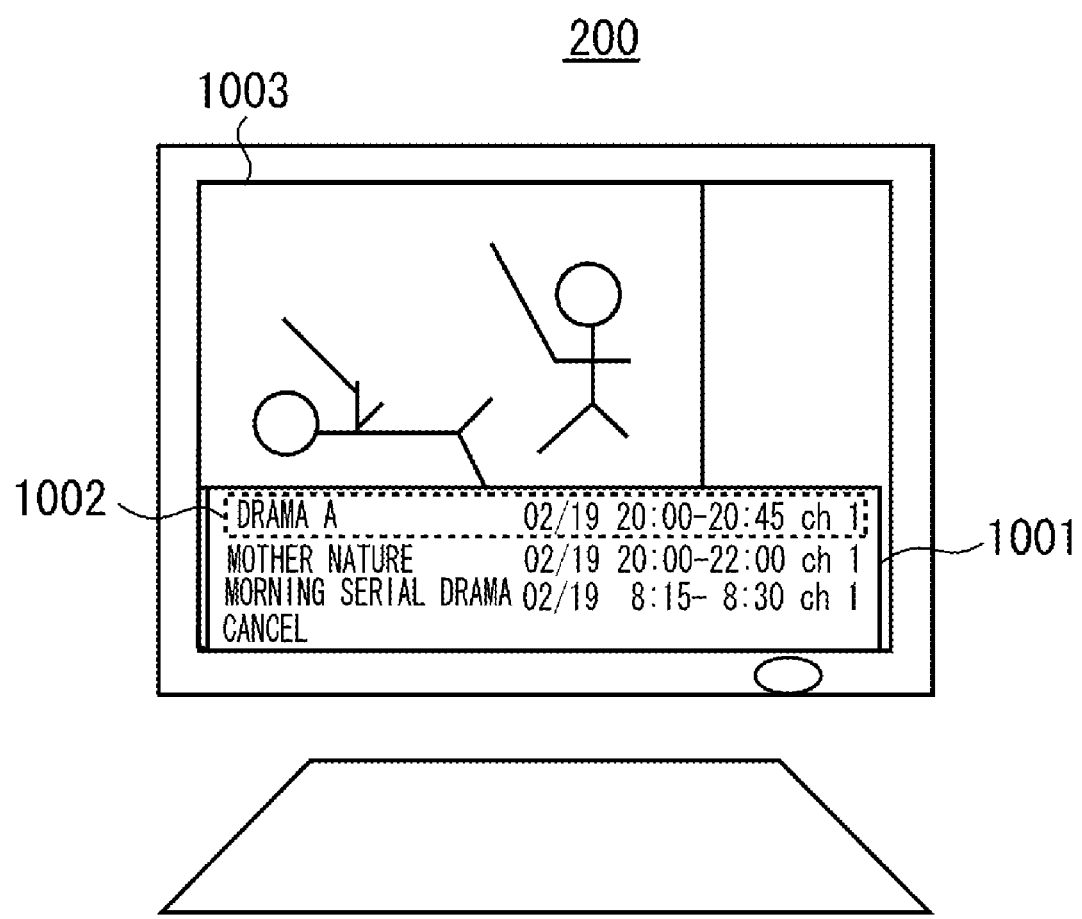
FIG. 10 illustrates another example of the display screen of the receiving apparatus.

In FIG. 9, in step S901, the CPU 211 reads out the reservable program list stored in the RAM 210 and causes the display unit 206 to display a reservation screen illustrated in FIG. 10. In FIG. 10, a reservable program list 1001 indicates reservable programs. A selection tab 1002 is used to select a program from among the reservable programs listed in the reservable program list 1001. The reservable program list 1001 is displayed together with a video image 1003 of a broadcast program which is being viewed.

In step S902, a determination is made whether a key operation of a move key on the remote control unit 300 is detected. If a key operation of a move key is detected, flow proceeds to step S905, where the CPU 211 moves the selection tab 1002 up or down. If a key operation of a move key is not detected, flow proceeds to step S903, where a determination is made whether a confirm key on the remote control unit 300 is pressed.

If, in step S903, it is determined that a confirm key is pressed, then in step S906, the CPU 211 makes a reservation of a program which is currently selected. If a confirm key is not pressed, then in step S904, it is determined whether a cancel key on the remote control unit 300 is pressed. If it is determined that a cancel key is pressed, then the CPU 211 turns off the reservable program list from the display screen, and then the processing ends.

As described above, according to the present embodiment, program reservation information for reservation setting is generated based on preview information included in a program preview of a scheduled broadcast program, and the program reservation information is displayed together with the program preview. Then, a recording reservation of a scheduled broadcast program associated with the program preview can be made in response to a reservation-setting instruction from a user.

Thus, the user can make a reservation of a scheduled broadcast program associated with the program preview without stopping viewing the current broadcast program. Additionally, even when a program preview is received, if preview information, such as an airdate, an airtime, and a channel, is not included in the program preview, the LED 217 will not be turned on, and program reservation information will not be displayed.

Thus, the user can easily know that, only if the LED 217 is turned on and program reservation information is displayed, the user can make a reservation of a scheduled broadcast program associated with the program preview.

The configuration of the present embodiment can be applied to a viewing reservation of a broadcast program as well as to a recording reservation. Also, according to the present embodiment, program reservation information is generated using preview information included in a program preview which is broadcasted while a broadcast program is being received. However, the preview information can be acquired using a method different from television broadcasting, such as a method using the WLAN control unit 214.

Furthermore, according to the first exemplary embodiment, the LED 217 is turned on when program reservation information is displayed. However, a lighting device other than a LED can also be used.

In the above described embodiment, preview information, as generated, is displayed on the display unit 206 of the receiving apparatus 200. However, preview information can be displayed on the display unit 303 of the remote control unit 300 according to another exemplary embodiment. The configuration of a receiving system according to the present embodiment, including a broadcast station, a receiving apparatus, and a remote control unit, is similar to the configuration of the receiving system according to the above described embodiment.

Also, the basic configuration and operation of the receiving apparatus according to the present embodiment is similar to that of the above described embodiment. Processing performed when additional information associated with a program preview is received in the present embodiment is different from the processing in the above described embodiment. Furthermore, a remote control unit 300 according to the present embodiment includes a LED 311 incorporated in a reservation key 306a.

Figure 11:
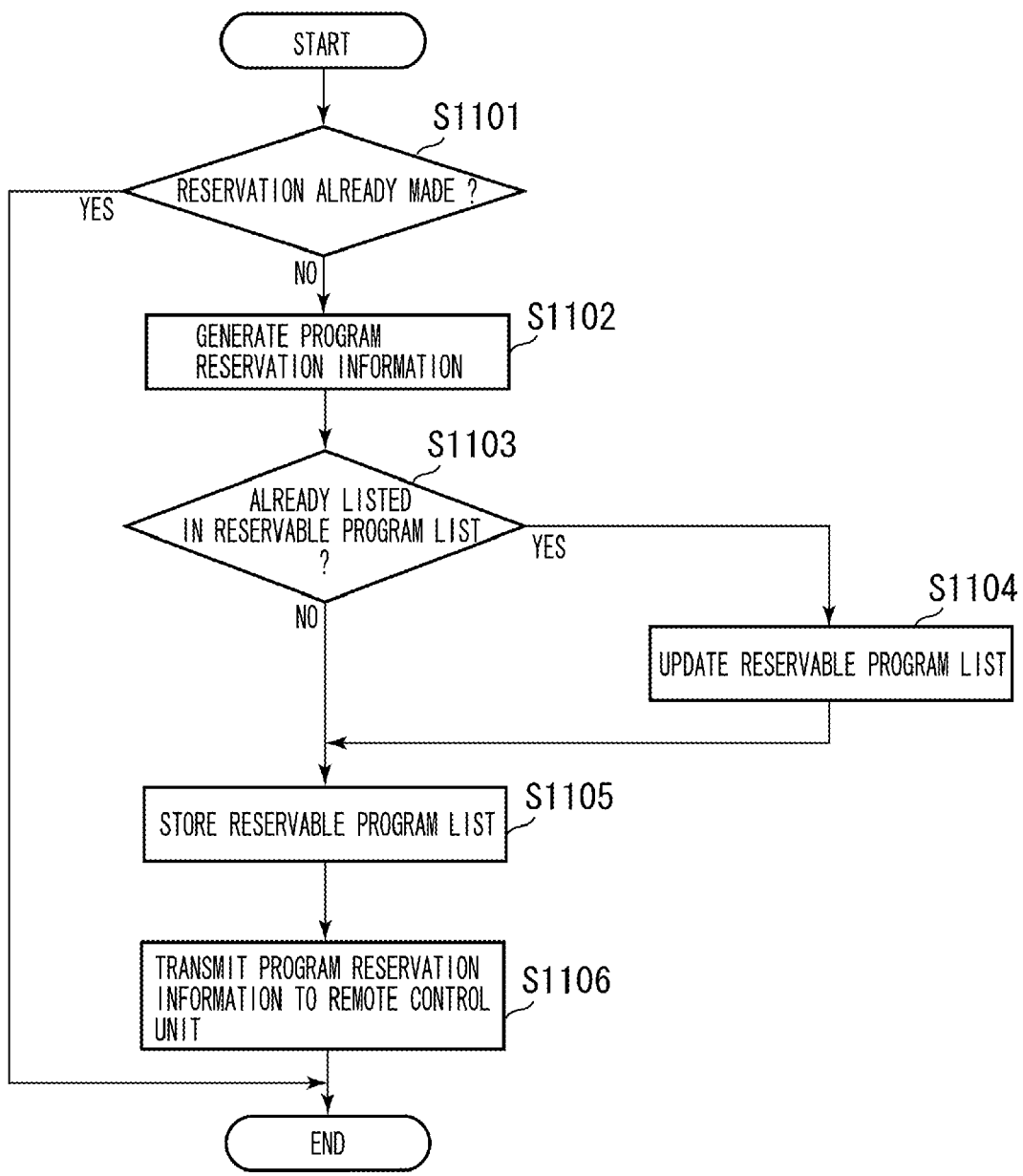
FIG. 11 is a flowchart illustrating processing performed by a receiving apparatus according to a second exemplary embodiment of the present invention.

FIG. 11 is a flowchart illustrating an operation of the receiving apparatus 300 performed when the receiving apparatus 200 receives preview information of a scheduled broadcast program. Prior to the processing of FIG. 11, the CPU 211 checks the additional information output from the TS decoder 203. When the CPU 211 receives and detects preview information associated with a program preview of a scheduled broadcast program, the processing illustrated in FIG. 11 starts.

More specifically, the CPU 211 detects preview information, including an airdate, an airtime, a channel, and a title of a scheduled broadcast program, included in the program preview from the additional information output from the TS decoder 203. Then, in step S1101, the CPU 211 compares the reservation setting information on a reserved broadcast program stored in the RAM 210 with the detected preview information and determines whether the scheduled broadcast program associated with the program preview is already reserved. If the scheduled broadcast program is already reserved (YES in step S1101), the processing ends.

If the scheduled broadcast program is not yet reserved (NO in step S1101), then in step S1102, the CPU 211 generates program reservation information including a title, an airdate, an airtime, and a channel of the scheduled broadcast program based on the detected preview information. Next, in step S1103, the CPU 211 determines whether the generated program reservation information is already listed in a reservable program list. The reservable program list is, for example, in the form illustrated in FIG. 7. If the generated program reservation information is already listed in the reservable program list (YES in step S1103), the CPU 211 deletes the previously registered program reservation information of the same program from the reservable program list, and registers the currently generated program reservation information in the reservable program list. Thus, the CPU 211, in steps S1104 and S1105, updates and stores the reservable program list.

If the generated program reservation information is not yet listed in the reservable program list (NO in step S1103), then the CPU 211 lists the generated program reservation information at the top of the reservable program list in step S1105. Then, in step S1106, the CPU 211 sends the program reservation information on broadcast programs listed in the reservable program list to the remote control unit 300 via the WLAN control unit 214.

Since a variety of transmission methods can be taken, it is to be understood that the transmission method described in the present embodiment is not limited to a particular transmission method, and thus its description is omitted. Also, the program reservation information described in the present embodiment includes at least a title, an airdate, an airtime, and a channel of the scheduled broadcast program.

Figure 12:
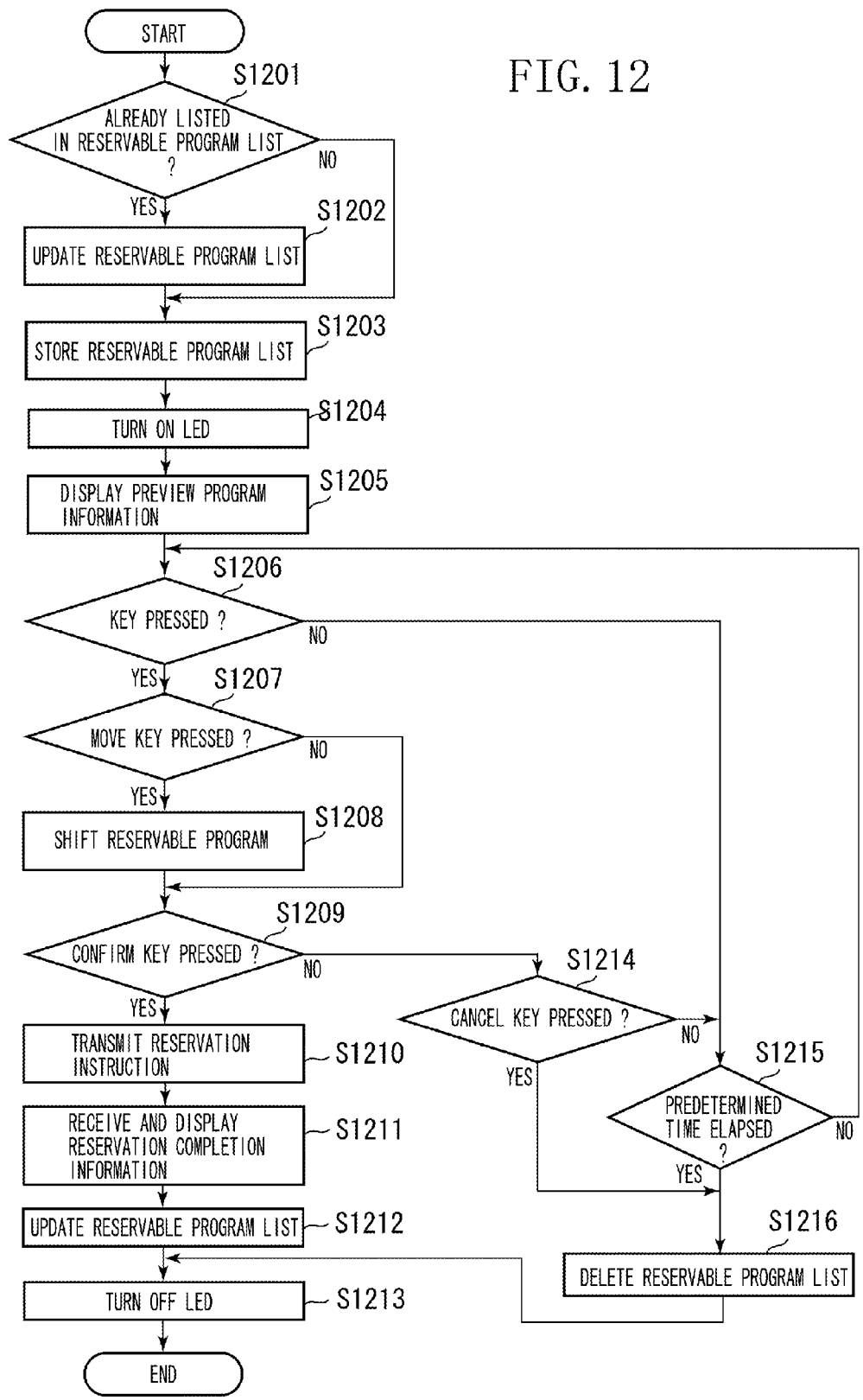
FIG. 12 is a flowchart illustrating processing performed by a remote control unit according to an exemplary embodiment of the present invention.

An operation of the remote control unit 300 performed when the transmitted program reservation information is received as described above is described with reference to the flowchart of FIG. 12. In the present embodiment, the processing illustrated in FIG. 12 is performed by the CPU 309 of the remote control unit 300. However, the processing can be performed in any location that would enable practice of the present invention. When the WLAN control unit 304 of the remote control unit 300 receives the program reservation information transmitted from the receiving apparatus 200 as described above, the processing in FIG. 12 starts.

First, in step S1201, the CPU 309 determines whether the received program reservation information is already listed in a reservable program list. The reservable program list is, for example, in the form illustrated in FIG. 7. If the received program reservation information is already listed in the reservable program list (YES in step S1201), the CPU 309 deletes the previously registered program reservation information of the same program from the reservable program list, and registers the currently generated program reservation information in the reservable program list. Thus, in steps S1202 and S1203, the CPU 309 updates and stores the reservable program list.

If the generated program reservation information is not yet listed in the reservable program list (NO in step S1201), then in step S1203, the CPU 309 lists the generated program reservation information at the top of the reservable program list. Then, in step S1204, the CPU 309 turns on the LED 311 incorporated in the reservation key 306*a* via the LED control unit 310. In step S1205. The CPU 309 causes the display control unit 302 to display program reservation information indicating reservable broadcast programs on the display unit 303, as illustrated in FIG. 13.

Figure 13:
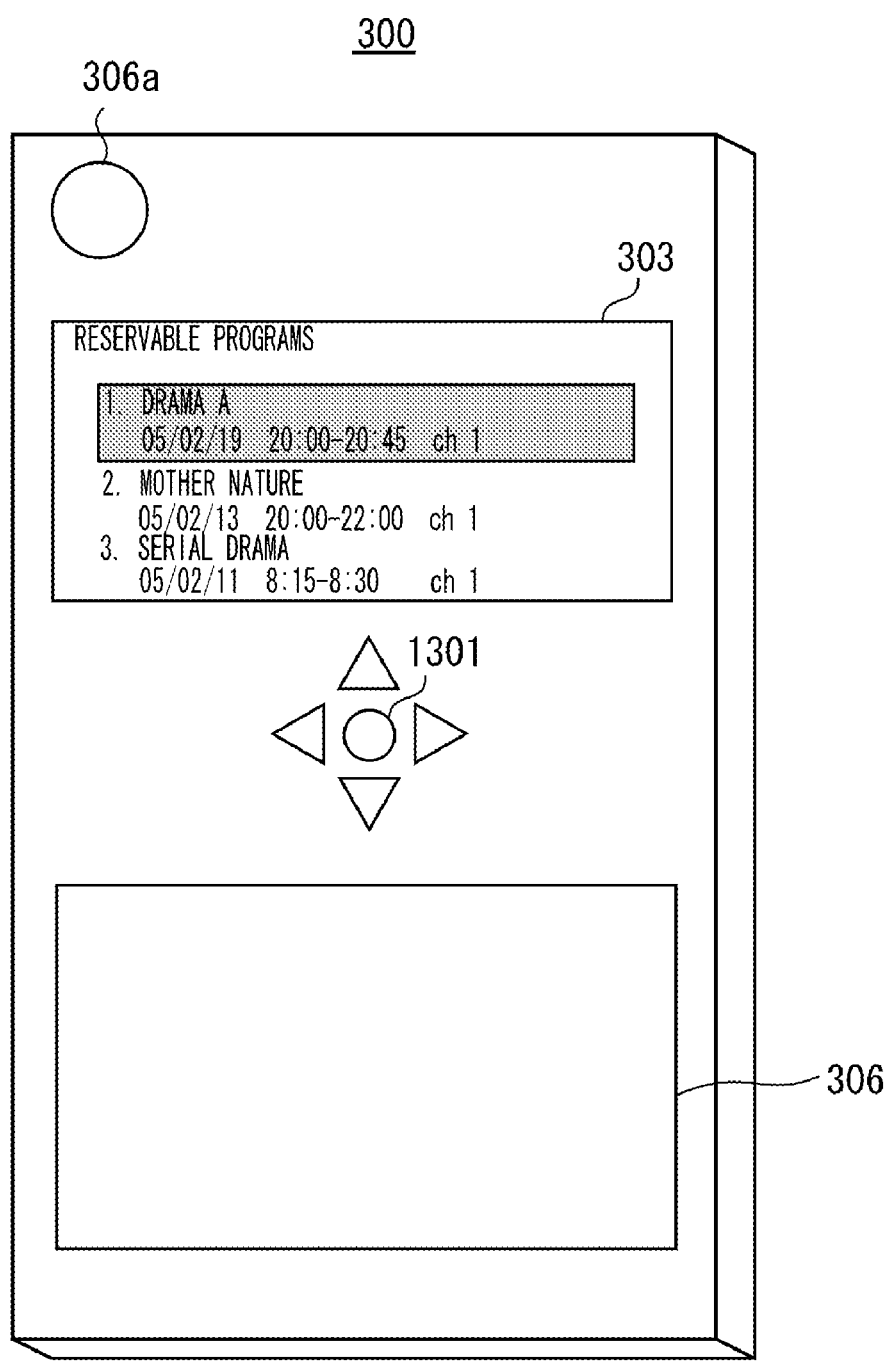
FIG. 13 is an outside view of a remote control unit according to an exemplary embodiment of the present invention.

FIG. 13 is an outside view of the remote control unit 300. A list of reservable programs is displayed on the display unit 303. The user can operate a move key and a confirm key 1301 to select a program to be reserved. Operation keys 306 include various operation keys.

After displaying a program information list as illustrated in FIG. 13, the CPU 309 detects a key operation in step S1206. Flow proceeds to step S1207 if a key operation is detected, where a determination is made whether a move key is pressed. The user can operate the move key of the remote control unit 300 to select a different broadcast program. If the user presses the move key (YES in step S1207), then in step S1208, the CPU 309 selects a different broadcast program. Next, in step S1209, a determination is made whether the confirm key 1301 is pressed.

If the user presses the confirm key (YES in step S1209), flow proceeds to step S1201, where the CPU 309 transmits a reservation execution instruction for the selected program to the receiving apparatus 200 via the WLAN control unit 304. When the CPU 309 receives information indicating that reservation is completed from the receiving apparatus 200 via the WLAN control unit 304, the CPU 309, in step S1211, displays this information on the display unit 303 in place of the reservable program list. The CPU 309 then updates the reservable program list by deleting the program whose reservation has been made in step S1212.

If no key operation is detected in step S1206, then in step S1215, a determination is made whether a key operation has occurred within a predetermined period of time. If there is no key operation within a predetermined period of time (several seconds to about one minute) after displaying of the reservable program list (YES in step S1215), the CPU 309 stops displaying the reservable program list in step S1216. Likewise, if the cancel key is pressed (YES in step S1214), the CPU 309 deletes the reservable program list in step S1216. Finally, in step S1213, the CPU 309 turns off the LED 311, and the processing ends.

Processing of the receiving apparatus 200 performed when the receiving apparatus 200 receives a program reservation instruction from the remote control unit 300 is described below with reference to the flowchart of FIG. 14. In step S1401, when the WLAN control unit 214 receives a reservation instruction from the remote control unit 300, the CPU 211 makes a reservation according to a reservation execution instruction. According to the present embodiment, only a program number written in the reservable program list is transmitted from the remote control unit 300. The CPU 211 selects program information of a specified program number from the reservable program list stored in the RAM 210 to make a reservation.

When the reservation is completed, the CPU 211, in step S1412, displays a reservation-completed screen illustrated in FIG. 8 on the display unit 206. Next, the CPU 211 updates the reservable program list by deleting the reservation-completed program from the reservable program list. Then, the CPU 211 notifies the remote control unit 300 that the reservation is completed via the WLAN control unit 214 in step S1404.

As described above, according to the present embodiment, program reservation information for reservation-setting is generated based on preview information transmitted together with a program preview of a scheduled broadcast program and is then transmitted to the remote control unit 300 to be displayed there. Then, a recording reservation of a scheduled broadcast program associated with the program preview can be made in response to a reservation-setting instruction from a user. Thus, the user can make a reservation of a scheduled broadcast program associated with the program preview without stopping viewing the current broadcast program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-112236 filed Apr. 14, 2006, which is hereby incorporated by reference herein in its entirety.

What is claimed is:

1. A system comprising:
a receiving apparatus; and
a remote control apparatus,
the receiving apparatus comprising:
a receiving unit configured to receive program preview data including preview image data and preview information of a program preview of television broadcasting, the preview information indicating an airdate, an airtime, a channel, and a title of a scheduled broadcast program;
a first display control unit configured to display an image represented by the preview image data of the program preview on a display unit of the receiving apparatus;
a memory unit configured to store reservation setting information about a reserved broadcast program;
a determination unit configured to compare the received preview information and the stored reservation setting information in response to the receiving unit receiving preview information of a scheduled broadcast program, and automatically determine whether a reservation of recording of the scheduled broadcast program corresponding to the received preview information has already been made;
a reservation information generation unit configured to generate program reservation information for reserving recording of a scheduled broadcast program corresponding to the received preview information when the determination unit determines that a reservation of recording of the scheduled broadcast program corresponding to the received preview information has not been made, the program reservation information being generated by using preview information being broadcasted together with the program preview, the program reservation information including an airdate, an airtime, a channel, and a title of the scheduled broadcast program; and
a first communication unit configured to perform communication with the remote control apparatus, and transmit the program reservation information generated by the reservation information generation unit to the remote control apparatus in a case where the determination unit determined that a recording reservation of the scheduled broadcast program corresponding to the received preview information has not been made,
the remote control apparatus comprising:
a second communication unit configured to perform communication with the receiving apparatus, and receive the program reservation information transmitted from the first communication unit of the receiving apparatus;
a second display control unit configured to display the program reservation information received by the second communication unit on a display unit of the remote control apparatus; and
an instruction unit configured to receive reservation instruction by a user to make a reservation of recording the scheduled broadcast program corresponding to the program reservation information displayed by the second display control unit,
wherein, if the instruction unit received the reservation instruction while the program reservation information is being displayed, the second communication unit transmits a reservation setting command to record the scheduled broadcast program associated with the program reservation information, and
wherein the reservation information generation unit does not generate the program reservation information for reserving recording of the scheduled broadcast program corresponding to the received preview information in a case where the determination unit determined that the reservation of recording of the scheduled broadcast program corresponding to the received preview information has been made.

2. The system according to claim 1, wherein the second display control unit of the remote control apparatus stops displaying the program reservation information after displaying the program reservation information for a predetermined period of time.

3. The system according to claim 1, wherein
the second display control unit of the remote control apparatus displays a plurality of program reservation information received by the second communication unit, and
wherein the instruction unit receives reservation instruction by a user to make a reservation of recording the scheduled broadcast program corresponding to the program reservation information selected from among the plurality of the program reservation information displayed by the second display control unit.

4. The system according to claim 1, wherein the remote control apparatus further comprises:
an LED, and
an LED control unit configured to turn on the LED when the second communication unit received the program reservation information transmitted from the first communication unit of the receiving apparatus.

* * * * *